Feb. 16, 1960 W. LISOWY 2,924,908
FISH HOOK TACKLE BOX
Filed Dec. 4, 1957
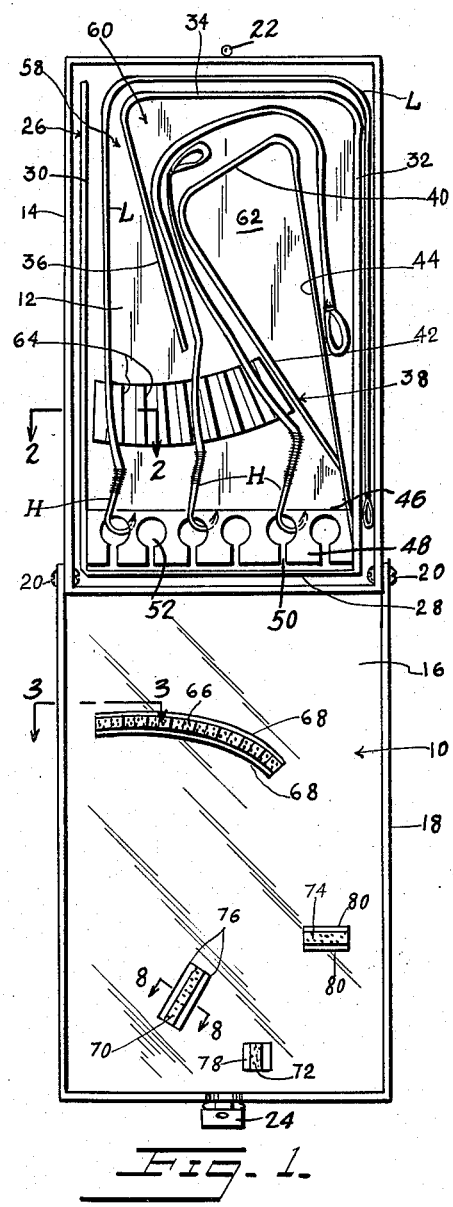
INVENTOR.
WILLIAM LISOWY
BY
ATTORNEY

United States Patent Office 2,924,908
Patented Feb. 16, 1960

2,924,908

FISH HOOK TACKLE BOX

William Lisowy, New York, N.Y.

Application Decembed 4, 1957, Serial No. 700,600

2 Claims. (Cl. 43—57.5)

This invention relates to a box or equivalent container for holding fishing tackle.

Tackle boxes have certain disadvantages, as conventionally constructed. For example, a conventional tackle box will often have various compartments for different items of fishing equipment, such as lures, flies, hooks and leaders, sinkers, etc. Nevertheless, these compartments are so arranged that it is quite easy, particularly when the tackle box is subjected to heavy usage, to shake the pieces of fishing equipment about in their compartments, causing them to become entangled with one another and even entangled with items from other compartments. One important object of the present invention, accordingly, is to provide a tackle box which will not have this notable deficiency, the box of the invention being particularly designed for holding snelled fish hooks, in a manner such that the leaders thereof will not become entangled and will be stretched out in positions such that they are all swiftly and immediately accessible to the user.

Another object is to provide, in a tackle box of the character stated, an arrangement wherein closing of the box will automatically cause all the leaders to be clamped firmly in position, so that they cannot move about from their assigned positions while the box is closed.

Another object is to so form the means that holds the leaders in position when the box is closed, as to nevertheless permit removal of any leader whenever the box is opened, that is, the invention is designed to move a leader-clamping pad from its leader-contacting position, responsive merely to opening of the tackle box.

Another object is to provide, in the tackle box, means at one end thereof for holding a substantial number of hooks, in an arrangement such that hooks of different sizes can be brought together in correspondingly different groups, each hook being swiftly and easily insertable or removable without interfering with or being interfered with by adjacent hooks.

Another object is to provide a tackle box of the character stated wherein partitioning means is incorporated in the box, so designed as to provide tortuous paths wherein the leaders can be extended, said paths being of different lengths to accommodate correspondingly different leader lengths.

Still another object is to provide means which will automatically separate each leader from leaders adjacent thereto, responsive to insertion of the leader in proper position within the box, the separated leaders thereafter being individually clamped responsive to closing of the tackle box.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of a tackle box embodying the invention.

Fig. 2 is an enlarged, detail sectional view on line 2—2 of Fig. 1, showing the serrations on a support plate for the leaders.

Fig. 3 is an enlarged, detail sectional view on line 3—3 of Fig. 1, showing the serrations of the pressure pad.

Fig. 4 is an enlarged, transverse sectional view through one of the auxiliary pressure pads of the box.

Referring to the drawings in detail, a tackle box generally designated 10 may be formed almost entirely from molded plastic or equivalent non-corrosive, relatively inexpensive, material. The tackle box 10 includes a main container portion 12, which in the illustrated example, but not necessarily, is of rectangular, relatively shallow configuration. Container portion 12 includes a continuous peripheral, relatively low wall 14 extending upwardly from a flat bottom wall.

A second main component of the device includes a lid 16, formed at its sides and at its distal end with a flange 18. The side portions of flange 18, and the side portions of wall 14, have registering openings, receiving rivets providing pivotal connections 20, whereby the lid is hinged on the container for movement between a container-closing position and an open position shown in Fig. 1, in which it is substantially coplanar with the comparatively shallow container portion.

At 22 there is provided a latching projection on the container portion, adapted to releasably interengage with a hinged latch 24 of lid 16.

Designated generally at 26 is a first or main partition mounted within container portion 12. As will be noted from Fig. 1, this is formed with a bight portion 28 extending parallel to and in closely spaced relation to the inner end wall of container portion 14, that is, the wall adjacent which lid 16 is hinged. Bight portion 28 at one end is integral with a first leg 30 of the first partition, extending parallel to and in closely spaced relation to one side portion of peripheral wall 14. Leg 30 terminates in closely spaced relation to the outer end wall of container portion 14.

At its other end, bight portion 28 is integral with a second leg 32 of first partition 26. This is parallel to leg 30, and perpendicular to bight portion 28, and extends in closely spaced relation to the other side portion of wall 14. Leg 32 terminates short of and in close proximity to the outer end wall of container portion 14, here merging into an L-shaped extension including a proximal extension portion 34 that extends parallel to and in closely spaced relation to the outer end wall of container portion 12, said extension portion 34 projecting from second leg 32 toward first leg 30 and terminating in closely spaced relation to the free end of first leg 30. At this location, extension portion 34 merges into a distal extension portion 36 of the L-shaped extension. Extension 36 projects toward bight portion 28, terminating, however, well short of the bight portion. Extension 36 is disposed at an acute angle to the extension portion 34.

An auxiliary partition generally designated 38 is of triangular shape, including an end portion 40 integral with side portions 42, 44 that converge in a direction away from the end portion, meeting at the side leg 32, adjacent the juncture between leg 32 and bight 28. Side portions 42, 44 extend obliquely to the lengths of legs 30, 32, while outer end portion 40 is oblique to the proximal extension portion 34.

Designated at 46 is a transverse partition. At 48 there is provided a flange, extending at an incline toward the bight portion 28. Flange 48, at locations uniformly spaced therealong, is formed with entrance slots 50 opening upon the edge of flange 48 that is near bight 28. Slots 50 merge into enlarged openings 52, receiving hooks H having leaders L. A hook can be inserted in or removed from an opening 52 through slots 50, and hooks of different sizes can be grouped for retention in different openings.

As will be apparent, on engagement of a hook in a selected opening, the leader thereof can be extended within selected, tortuous channels defined by the auxiliary and main partitions 38, 26 respectively. Said partitions define a U-shaped channel 58 of substantial length, within which some leaders can be extended. Other leaders can be extended through another U-shaped channnel bounding and defined by the triangular secondary partition 38, and designated 60.

All the leaders, regardless of which channel they are disposed in, are stretched out, so as to prevent tangling thereof and so as, further, to insure that they will not have a coil or coils that will not open up immediately when the leader is deposited in the water. Still further, all leaders, regardless of the channels in which they are disposed, extend across an unchanneled, open space adjacent flange 48. In this space, there is provided a series of serrations 64, which may be formed integrally upon the bottom wall of the container portion 12, as shown. These serrations are extended in the direction following that in which the leaders would extend into the channels from flange 48. Therefore, as each leader is laid into the box, it will automatically fall into a recess defined between adjacent serrations 64, to be separated from adjacent leaders.

In this space also a clamping action is exerted against the leaders when the tackle box is closed, through the provision of a pressure pad shown to particular advantage in Figs. 1 and 3.

The pressure pad has been designated at 66, and is cemented to or otherwise securely engaged between retaining flanges 68 molded integrally with the inner surface of the lid 16 in a position extending transversely of the lid. The pad 66 is serrated corresponding to the serrations 64, the serrations of the pressure pad interfitting with those of the container portion. The pressure pad may be formed of a soft, resiliently compressible material such as foam rubber. The pressure pad is so disposed and proportioned that when the lid is closed, it will extend across the open space into which the channels 58, 60 open, and will exert a clamping action against all the leaders where they extend across said open space.

The partitions 26, 38 rise within container portion a distance sufficiently to cause the lid to bear firmly thereagainst when the lid is closed. Further, when the lid is closed, the pressure pad will be caused to bear firmly against the several leaders, clamping them against the bottom wall of container portion 12 in a manner to insure against movement of the leaders from their assigned positions. In this way, the pressure pad cooperates with the walls of the tortuous channels, in that the pressure pad bears against the inner end portions of the leaders, that is, the portions adjacent the hooks H, while the outer end portions are confined in the tortuous channels.

At 62 there is defined a closed compartment bounded by the partition 38. In this there can be placed various articles of fishing equipment, such as lures, sinkers, etc.

There can also be provided auxiliary pads, which are designed to exert a clamping pressure in the same manner as the main pressure pad, but at different locations along the lengths of the leaders, within the various channels. Thus, auxiliary pad 70 extends across the channel 60 in the closed position of the lid, while auxiliary pads 72, 74 extend across the channel 58.

Pads 70, 72, 74 are respectively engaged between pairs of flanges 76, 78 and 80, respectively.

While I have illustrated and described the preferred embodiment of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A fishing tackle box comprising a container portion, a lid for the container portion, a plurality of partitions in the container portion defining channels therein for the leaders of snelled hooks, means in the container portion at one end thereof for engaging said hooks, and means on the lid adapted to bear against the leaders in the closed position of the lid, comprising a pressure pad of a resiliently compressible material, the container portion having an open space communicating with the several channels, the pressure pad extending into said open space in the closed position of the lid to engage the leaders that extend into different channels, said pressure pad extending transversely of the lid in substantially parallel relation to the hook-engaging means, said means for bearing against the leaders including a plurality of spaced auxiliary pressure pads secured to the lid in position to extend into the various channels in the closed position of the lid, thus to bear against the leaders at locations spaced from that at which the first-named pressure pad bears thereagainst.

2. A fishing tackle box comprising a container portion, a lid for the container portion, a plurality of partitions in the container portion defining channels therein for the leaders of snelled hooks, means in the container portion for engaging said hooks, and means on the lid adapted to bear against the leaders in the closed position of the lid, comprising a pressure pad of a resiliently compressible material, the container portion including a member having a plurality of serrations extending across an open space in the container to define recesses in which the leaders will be confined, said serrated member being disposed for engagement by the pressure pad, the pressure pad having serrations complementary to those of the container portion.

References Cited in the file of this patent

UNITED STATES PATENTS

| | | |
|---|---|---|
| 891,103 | Schaney | June 16, 1908 |
| 952,314 | Ellsworth | Mar. 15, 1910 |
| 2,724,208 | Nelson | Nov. 22, 1955 |